United States Patent [19]

Kobayashi et al.

[11] 4,395,987
[45] Aug. 2, 1983

[54] DISTRIBUTION TYPE FUEL INJECTION APPARATUS

[75] Inventors: Masayoshi Kobayashi, Kawagoe; Kenji Okamoto, Higashimatsuyama, both of Japan

[73] Assignee: Diesel Kiki Co., Ltd., Japan

[21] Appl. No.: 256,184

[22] Filed: Apr. 21, 1981

[30] Foreign Application Priority Data

Apr. 26, 1980 [JP] Japan .................................. 55-54881
May 1, 1980 [JP] Japan .................................. 55-57133

[51] Int. Cl.³ ............................................ F02M 59/20
[52] U.S. Cl. ................................. 123/458; 123/459; 123/503; 123/506
[58] Field of Search ............... 123/449, 458, 459, 506, 123/500, 503, 357, 501

[56] References Cited

U.S. PATENT DOCUMENTS

| 1,664,608 | 4/1928 | French | 123/357 |
| 2,499,706 | 3/1950 | Ward | 123/357 |
| 3,796,197 | 3/1974 | Locher et al. | 123/458 |
| 3,880,131 | 4/1975 | Twaddell et al. | 123/458 |
| 3,896,779 | 7/1975 | Omori et al. | 123/458 |
| 4,050,856 | 9/1977 | Kobayashi et al. | 123/503 |

FOREIGN PATENT DOCUMENTS

| 2503324 | 7/1976 | Fed. Rep. of Germany | 123/449 |
| 2041577A | 9/1980 | United Kingdom | 123/458 |

Primary Examiner—Charles J. Myhre
Assistant Examiner—Magdalen Moy
Attorney, Agent, or Firm—Guy W. Shoup; Gerard F. Dunne

[57] ABSTRACT

A distribution type fuel injection apparatus has a fuel injection pump having a solenoid valve for controlling pressure of a high-pressure chamber of the apparatus. The solenoid valve is actuated or deactuated at the optimum time for fuel injection end or beginning by a control signal produced by a circuit for computing the optimum timing in accordance with the condition of engine operation. Thus, precise control of injection timing or injection amount injected can be attained by electronic control without a complex mechanical structure.

9 Claims, 18 Drawing Figures

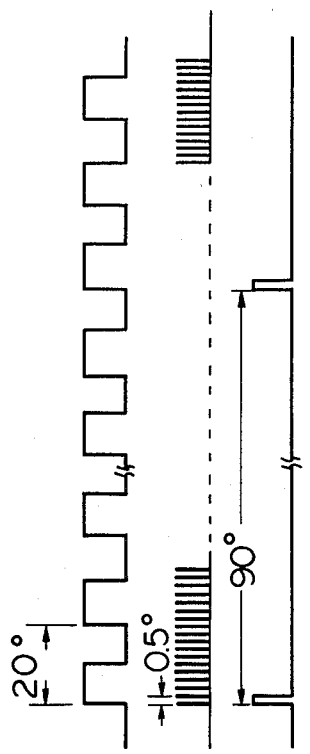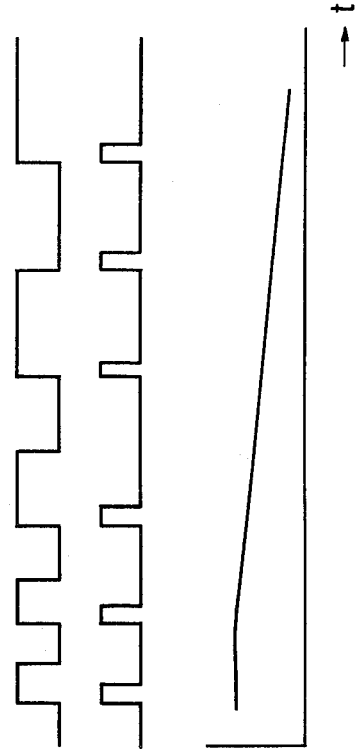

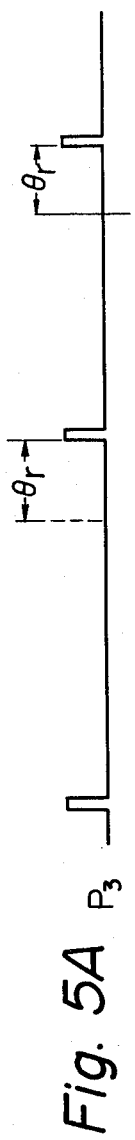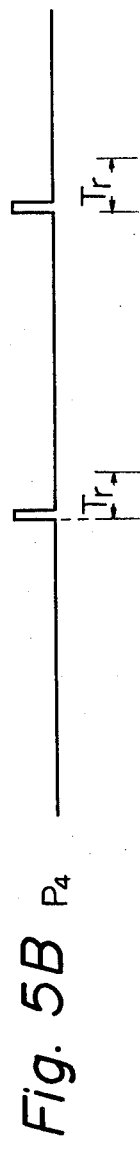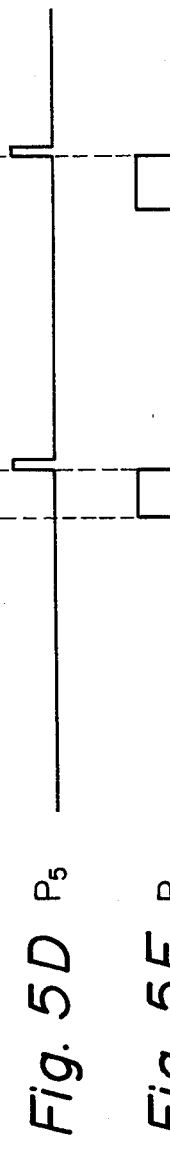
Fig. 5A P₃
Fig. 5B P₄
Fig. 5C P₂
Fig. 5D P₅
Fig. 5E P₆

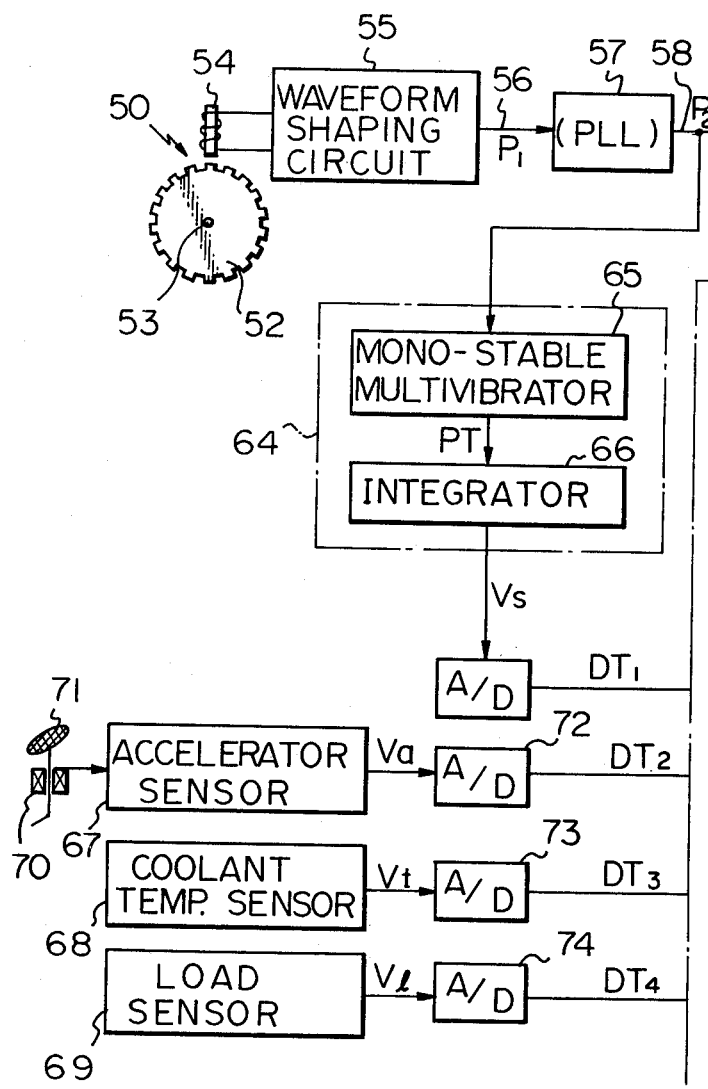

DISTRIBUTION TYPE FUEL INJECTION APPARATUS

The present invention relates to a distribution type fuel injection apparatus for internal combustion engine systems.

In a conventional distribution type fuel injection apparatus, fuel pressurized by, for example, a vane pump is fed to a pump housing having a roller holder, a cam disc, etc. therein. The fuel is then fed, in a predetermined amount, to injection nozzles of respective cylinders with a timing predetermined in accordance with the forward movement of a plunger having a rotating motion. In the injection apparatus, although the fuel is used also as a lubricant for mechanical parts in the pump housing, fuel of this type has a low viscosity and does not give sufficient lubrication. Therefore mechanical wear is caused at various portions, shortening the life of the apparatus. Moreover, there is further caused errors in dimensions of various parts due to the wear, so that it is difficult to maintain the initial performance of the apparatus for a long time. Furthermore, in the distribution type fuel injection apparatus, the beginning and the end of the fuel injection timing are controlled in accordance with positional change relative to a distributor head or a control sleeve caused by the reciprocation of the plunger having a rotating motion. This control system has a disadvantage that the adjustment of the beginning and end of the timing is complicated and difficult.

It is an object of the present invention to provide an improved novel distribution type fuel injection apparatus which is capable of obviating the disadvantages involved in the conventional distribution type fuel injection pump.

It is another object of the present invention to provide a distribution type fuel injection apparatus which is capable of easily and electrically controlling the timing of the beginning and end of the injection.

It is a further object of the present invention to provide a distribution type fuel injection apparatus which using a simple structure is capable of precisely and electrically controlling the amount of fuel injected.

It is still another object of the present invention to provide a distribution type fuel injection apparatus which is simple in structure and has a long mechanical life.

According to the present invention, in a distribution type fuel injection apparatus, the injection apparatus has a fuel injection pump wherein fuel is pressurized in a barrel in a high-pressure chamber to inject the fuel therefrom in accordance with a reciprocating motion of a plunger having rotating motion. The injection pump has a solenoid valve which is capable of providing a path of communication between the high-pressure chamber and the outside atomosphere, and the solenoid valve is opened or closed by being actuated or deactuated in accordance with the control signal from a control unit. The control unit comprises means for producing a data signal indicative of the optimum time period for injecting fuel on the basis of the operating condition of an engine combined with the fuel injection apparatus, means for generating an end signal indicative of the timing of the end of the fuel injection on the basis of the data signal, and means for actuating the solenoid valve in response to the end signal so as to have the valve open at a time that accords with the end signal. The generating means may also include a signal generator for generating a beginning signal indicative of the timing of the beginning of the fuel injection and the end signal is produced on the basis of the data signal and the beginning signal. The signal generator may be a sensor for detecting the beginning of the fuel injection timing or means for producing an optimum beginning signal indicative of optimum timing for beginning fuel injection.

Consequently, the amount of fuel injection is controlled to an optimum value by the opening of the solenoid valve at the time indicated by the end signal. Moreover, when the optimum beginning signal can be obtained in the generating means, the valve is closed to begin the pressurizing operation of the fuel in the high-pressure chamber at the time shown by the optimum beginning signal and the valve is opened to terminate the pressurizing operation of the fuel in the high-pressure chamber at the time shown by the end signal. As a result, the amount of the injected fuel can be precisely controlled.

According to the arrangement as described above, since the fuel is not fed to the housing chamber containing the cam disc and the roller holder therein and an optimum lubricating oil having a high viscosity can be employed for mechanisms contained in the housing chamber, wear to parts of the mechanisms can effectively be prevented. As a result, the life of the apparatus can be prolonged very much. Moreover, since there is no need to use the fuel also as a lubricating oil, fuel can be selected freely irrespective of its viscosity. In addition, since the control of the timing of the beginning and end of the injection, which has heretofore been carried out mechanically, can be effected electrically, the mechanisms can be simplified and the adjustment thereof can be made easily so that accurate control of injection amount can be effected easily.

Further objects and advantages of the present invention will be apparent from the following detailed description to be read in conjunction with the accompanying drawings in which:

FIGS. 3A to 3C are timing charts of the signals appearing in FIG. 2;

FIGS. 4A to 4C are timing charts for explaining the operation of the circuit illustrated in FIG. 2;

FIGS. 5A to 5E are timing charts for explaining the operation of the circuit illustrated in FIG. 2;

FIGS. 8A and 8B show a block diagram of an electronic control system of the apparatus illustrated in FIG. 7.

Figure 1:
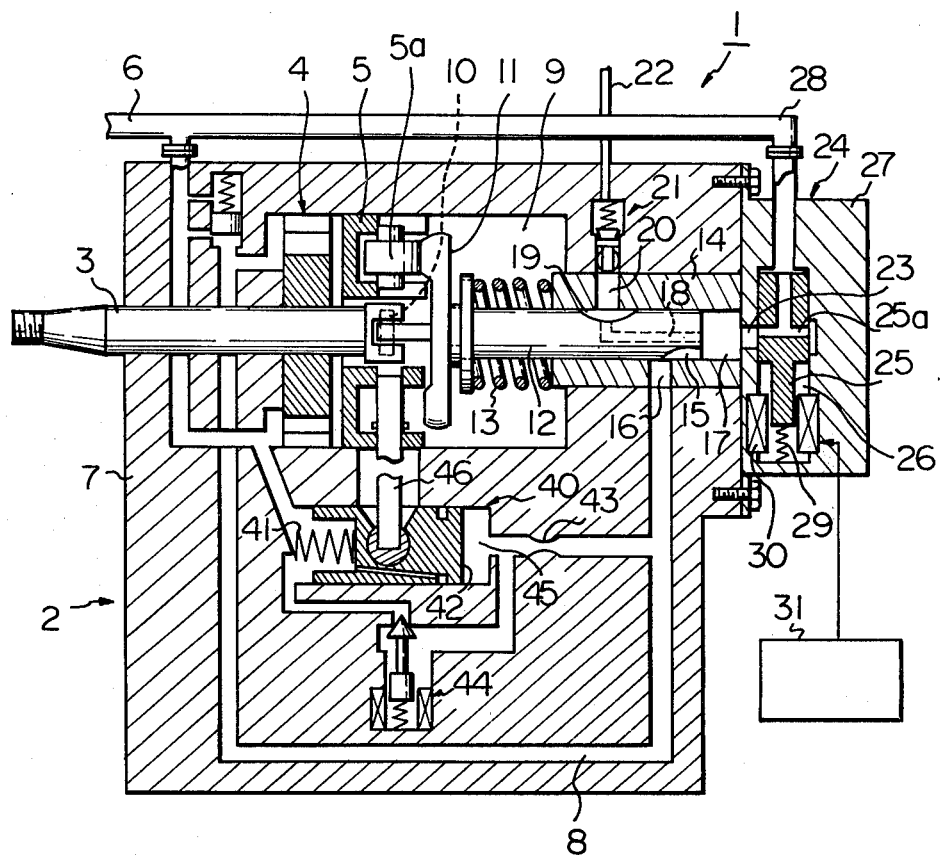
FIG. 1 is a sectional view of an embodiment of a distribution type fuel injection apparatus of the present invention.

FIG. 1 illustrates an embodiment of a distribution type fuel injection apparatus used for a fuel injection system of the present invention. The fuel injection apparatus 1 is used in combination with an internal combustion engine, such as a diesel engine (not illustrated), for feeding fuel to cylinders of the internal combustion engine, and is composed of a fuel injection pump and a control unit for electrically controlling the fuel injecting operation of the pump. An injection pump 2 includes a vane pump 4, which is coupled to a driving shaft 3 adapted to be driven at the rotational speed of the internal combustion engine, and a roller holder 5. The vane pump 4 pressurizes fuel supplied from a fuel tank (not illustrated) through a passage 6 and then supplies the pressurized fuel to a passage 8 formed in a housing 7. One end of the driving shaft 3 which is rotatably supported in the housing 7 extends into a housing chamber 9 and is coupled to a cam disc 11 through a driving disc 10. A plunger 12 is pressed against one side of the cam disc 11 by a plunger spring 13. Thus, a cam face of the cam disc 11 comes in contact with rollers 5a supported by the roller holder 5 by the spring force. In FIG. 1, only one roller 5a appears. The plunger 12 is fitted in a plunger barrel 14 which is rigidly mounted in the housing 7 and the plunger 12 performs the reciprocating motion along its axis while rotating in accordance with the rotation of the driving shaft 3. The arrangement which causes the plunger 12 to make the above mentioned reciprocating and rotating motion, per se, is the same as that of the conventional distribution type fuel injection pump.

The plunger 12 has, at the end fitted into the plunger barrel 14, intake slits 15 corresponding to the respective cylinders of the engine (only one of a plurality of intake slits is shown in FIG. 1). In a backward moving stroke of the plunger 12 (toward the left in FIG. 1), when an intake port 16 formed at an end portion of the passage 8 meets an intake slit 15, the pressurized fuel fed through the passage 8 goes into a high-pressure chamber 17 and a passage 18 formed in the plunger 12. After this, when the intake port 16 is closed in a forward stroke of the plunger 12 (toward the right in FIG. 1), the pressurized fuel thereby taken in begins to be further pressurized in the high-pressure chamber 17 as the plunger 12 is rotatingly advanced (is rotatingly moved toward the right in FIG. 1). The passage 18 communicates with a distributor slit 19. When the plunger 12 further continues its rotatingly advancing movement and the distributor slit 19 communicates with an outlet passage 20, the highly pressurized fuel in the high-pressure chamber causes a delivery valve 21 to open and is delivered to an injection pipe 22 connected to an injection nozzle (not illustrated).

The fuel injection apparatus is provided with a solenoid valve 24 connected to the high-pressure chamber 17 through a passage 23 for the purpose of controlling the timing of the beginning and end of the fuel injection irrespective of the position of the plunger 12 and without employing a control sleeve. The solenoid valve 24 is comprised of a piston 25 having a passage 25a therein and a cylinder chamber 26 formed in the valve body 27 for housing the piston 25 therein. One end of the cylinder chamber 26 communicates with the fuel tank (not illustrated) through a passage 28. The piston 25 is normally biased upwardly by a compression spring 29. When an exciting coil 30 is deenergized, the piston 25 is so positioned that the passage 23 may communicate with the passage 25a, and the solenoid valve 24 is in its opened position as shown in FIG. 1. On the other hand, when the exciting coil 30 is energized, the piston 25 is attracted downward against the action of the spring 29 and an open end of the passage 23 on the cylinder chamber side is closed by a sidewall of the piston 25 to put the solenoid valve 24 into a closed position. This solenoid valve 24 is actuated or deactuated by a control unit 31 in such a way that it may be closed at an optimum time for the beginning of the fuel injection and opened at an optimum time for the end of the fuel injection in accordance with the operating conditions of the engine.

Numeral 40 designates an injection rate controlling device which consists of a conventional timer device. Although the axis of device 40 is shown here as being parallel with that of driving shaft 3 for convenience in explaining the apparatus, in the actual apparatus, device 40 is located in such a way that the axes of piston 42 and drive shaft 3 are at right angles to each other. The injection rate controlling device 40 has a piston 42 one end face of which is urged by a compression spring 41. Pressure within the passage 8 is applied to the other end face of the piston 42 through a constriction 43. A pressure regulating valve 44 is provided for regulating the pressure to be applied to piston 42 so as to locate the piston 42 at a desired position. The divergence of pressure regulating valve 44 is controlled so as to set the pressure within the cylinder chamber 45 at a desired value. Piston 42 is articulatedly connected to one end of a rod 46 whose opposite end is connected to the roller holder 5, so that the angular position of roller holder 5 may be varied according to the position of piston 42 thereby to control the fuel injection rate.

Figure 2A:
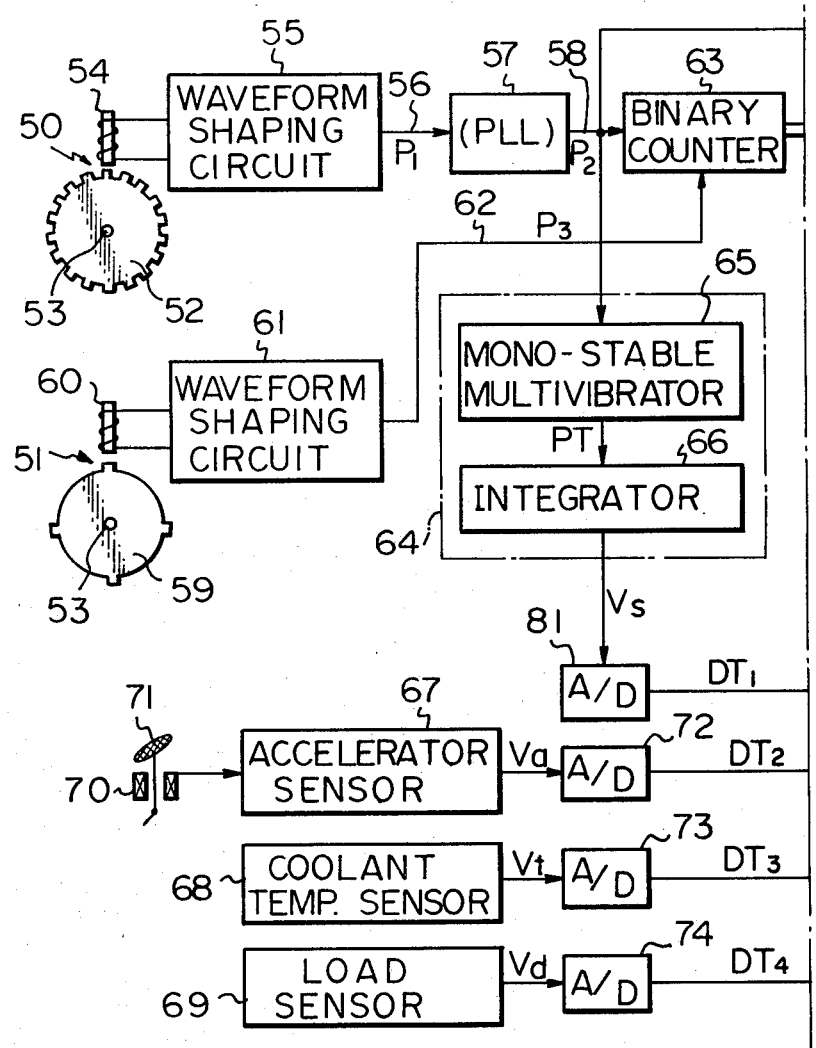
FIGS. 2A and 2B show a block diagram of an electronic control system of the apparatus illustrated in FIG. 1.
Figure 2B:
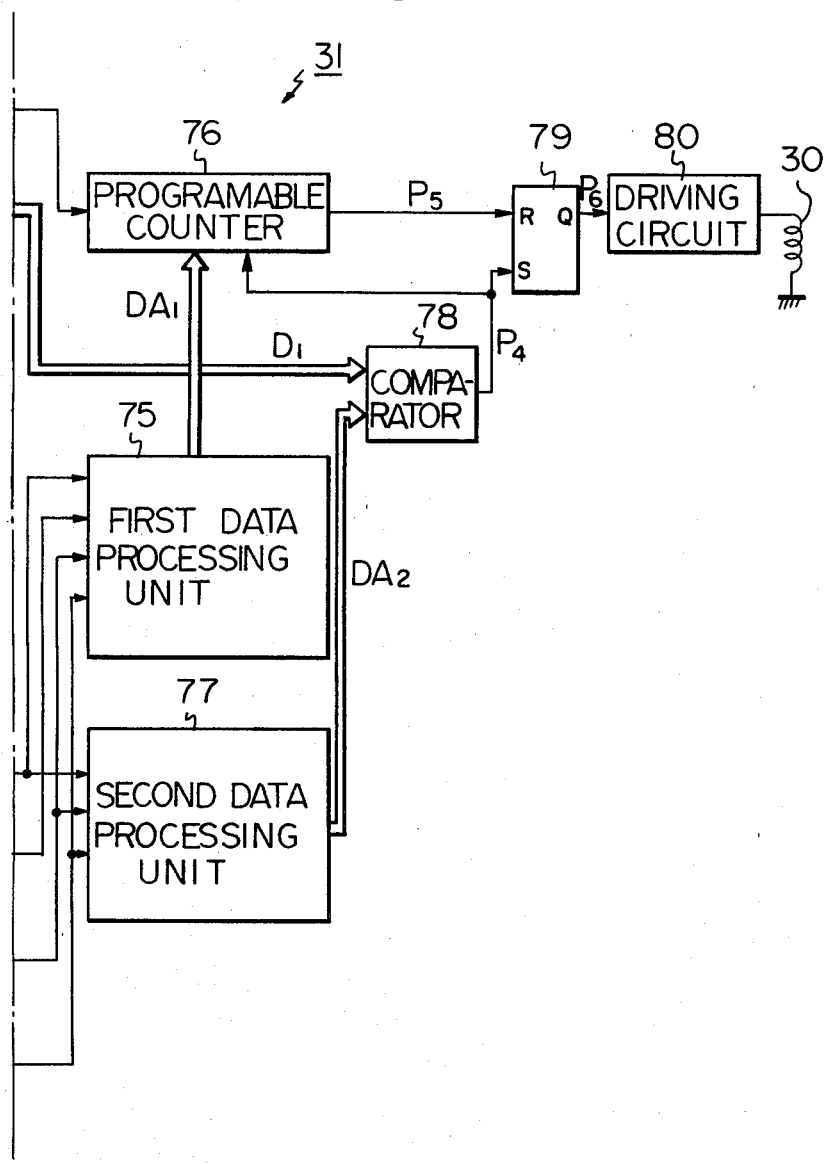

FIG. 2 is a block diagram of the electronic control system for controlling the solenoid valve 24 shown in FIG. 1. The control system has a sensor 50 for generating a signal which changes in frequency in accordance with the engine speed, and a reference timing sensor 51 for generating a reference timing pulse train signal $P_3$ at the time the crank of the engine associated with the particular cylinder is at its top dead center. The sensor 50 comprises a gear 52 secured to the crankshaft 53 of the engine associated with fuel injection pump 2 so as to rotate with the revolution of the engine and an electromagnetic pick-up coil 54 located close to gear 52. A large number of cogs are formed on the periphery of gear 52 and a variable a.c. output signal is produced from the electromagnetic pick-up coil 54 as each cog approaches and then moves away from coil 54 in sequence with the rotation of the engine. The output signal from coil 54 of sensor 50 is put into a waveform shaping circuit 55 to generate a square wave signal having the same frequency as that of the output signal from sensor 50. Since the cogs of gear 52 are formed at equal intervals on the periphery of gear 52, the pulse train signal $P_1$ derived from the waveform shaping circuit 55 (shown in FIG. 3A) is composed of pulses each produced as the crankshaft 53 rotates by a predetermined angle.

In this embodiment, since gear 52 has eighteen cogs, one pulse is produced by circuit 55 for every 20 degrees of rotation of gear 52. The above-mentioned pulse train from the waveform shaping circuit 55 is sent through an output line 56 to a frequency multiplier 57.

Frequency multiplier 57 is arranged as a phase locked loop (PLL) circuit and the pulse train signal $P_1$ appearing on line 56 is multiplied in frequency. Thus, a resulting signal with a frequency N-times as great as that of the signal from the circuit 55 is produced by the frequency multiplier 57. The value of N can be arbitrarily selected. When a multiplication rate of 40 is selected for frequency multiplier 57, for example, it follows thus that pulse train signal $P_2$ appearing on the output line 58 is composed of pulses each produced as crankshaft 53 rotates by 0.5 degrees of rotation of the gear 52 (shown in FIG. 3B).

Sensor 51 is composed of a gear 59 secured to crankshaft 53 and an electromagnetic pick-up coil 60 located close to gear 59. Sensor 51 is different from sensor 50 only in that the cogs of gear 59 are formed at intervals of 90 degrees, for a four cylinder engine. Since the relative positional relationship between gear 59 and coil 60 is such that one of the cogs of gear 59 is opposite coil 60 each time the associated crank is at top dead center, coil 60 produces a signal indicative of the time the crank is at top dead center and this signal is applied to a waveform shaping circuit 61 to produce the reference timing pulses $P_3$ indicative of top dead center timing on the output line 62 (shown in FIG. 3C).

For the purpose of detecting the angular position of crankshaft 53, there is provided a binary counter 63 to which the pulse train signal $P_2$ is applied as counting pulses. Each of the reference timing pulses $P_3$ is also applied to counter 63 as a reset pulse so counter 63 is reset each time a reference timing pulse $P_3$ is produced. As a result, binary counter 63 operates so as to count the number of pulses of pulse train signal $P_2$ produced just after the crankshaft reaches top dead center. Consequently, the content of the counted data $D_1$ derived from counter 63 in digital form represents the rotational angle position of gear 52 or crankshaft 53.

Pulse train signal $P_2$ is also applied to a speed voltage generator 64 for generating an analog voltage $V_s$ which changes in magnitude in proportion to the speed of the engine. The speed voltage generator 64 is a known circuit comprising a mono-stable multivibrator 65 which is triggered by the leading edge of each pulse of signal $P_2$ and an integrator 66 to which the output pulse train PT from mono-stable multivibrator 65 is applied. With the above-mentioned circuit structure of speed voltage generator 64, when signal $P_2$ is changed in frequency as illustrated in FIG. 4A in accordance with the change of the engine speed, the period of output pulse train PT is also changed in accordance with the change of that of signal $P_2$, but the pulse width for high level thereof is of a constant value determined by the adjustment of mono-stable multivibrator 65 (FIG. 4B). Thus, the analog voltage $V_s$ shown in FIG. 4C is produced by integrator 66 as a signal indicative of the engine speed, and the analog voltage $V_s$ is converted into digital form by an analog-digital converter (A/D) 81 to produce data $DT_1$ in digital form showing the engine speed.

For the purpose of detecting the conditions of engine operation, there are provided an accelerator sensor 67, a coolant temperature sensor 68 and a load sensor 69. The accelerator sensor 67 is connected to a sensor coil 70 for generating an electric signal which varies in accordance with the degree of depression of an accelerator pedal 71, and an analog voltage signal $V_a$ indicative of the degree of the depression of accelerator pedal 71 is produced from accelerator sensor 67. A conventional position sensor may be employed as accelerator sensor 67. The coolant temperature sensor 68 includes a thermistor mounted on the cylinder head of the engine and an analog voltage signal $V_t$ which varies in magnitude in accordance with the coolant temperature of the engine. Load sensor 69 may be arranged so as to detect the position of a member for adjusting the amount of fuel injected, and an analog voltage signal $V_d$ indicative of the load of the engine is produced therefrom. These detected signals $V_a$, $V_t$ and $V_d$ are converted into digital form data by analog-digital (A/D) converters 72, 73 and 74, respectively, to produce digital data $DT_2$, $DT_3$ and $DT_4$.

Data $DT_1$ to $DT_4$ are applied to a first data processing unit 75 which produces data $DA_1$ indicative of the optimum effective angle for injecting fuel. Effective angle for injecting fuel is defined as the crankshaft angle range which corresponds to the time period during which fuel is effectively injected, and will be referred to as "effective angle" hereinafter. As is well known, the optimum effective angle depends upon the conditions of the engine operation at each instant, and the relationship between the optimum effective angle and the operating conditions, such as engine speed, coolant temperature, the degree of the depression of the accelerator pedal or the like, can be usually determined experimentally. Unit 75 includes a memory in which the data concerning the above relationship obtained in the way mentioned above is stored and the optimum effective angle can be selected in accordance with a set of contents of the input digital data mentioned above. There is known an electronic circuit which includes a memory for storing the resulting data determined by the contents of input data in advance and which can output the stored data corresponding to the input data from the memory when the input data is applied to the electronic circuit. It is one of the prior art techniques to store the resulting data in advance at the address of the memory designated by the input data corresponding to the resulting data and to obtain the resulting data by applying the input data to the memory as address data. (For example, U.S. Pat. No. 3,689,753) The resulting output data $DA_1$ in digital form from the first data processing unit 75 is a binary signal and is applied to a programable counter 76 as code data for determining the dividing ratio of programable counter 76.

Data $DT_1$, $DT_3$ and $DT_4$ are also applied to a second data processing unit 77, which produces data $DA_2$ indicative of the optimum injection advance, that is the optimum timing of the beginning for fuel injection, in accordance with the contents of input data $DT_1$, $DT_3$ and $DT_4$. The relationship between the optimum injection advance value and the conditions of engine operation can also be determined experimentally and unit 77 includes a memory section in which the data concerning the relationship therebetween obtained by a similar way to that of the unit 75 are stored. Then, when unit 77 is provided with the information concerning the condition of engine operation by data $DT_1$, $DT_3$ and $DT_4$, data $DA_2$ the content of which is the crankshaft angle corresponding to the optimum injection advance under those conditions is produced. Data $DA_2$ is applied to one input terminal of a comparator 78 to the other input terminal of which counted data $D_1$ is applied and data $DA_2$ is compared with counted data $D_1$. The comparator produces timing pulses $P_4$ each time the content of counted data $D_1$ is coincident with that of data $DA_2$. That is, timing pulses $P_4$ are developed each time the angle position of crankshaft 53 is at the optimum angle position for beginning fuel injection as determined by data $DA_2$. In this embodiment, since the relationship between the binary code of binary data $DA_2$ and the angle of the crankshaft 53 shown by its binary code is determined to be the same as the relationship between the binary code of the binary data $D_1$ and the actual angle of the crankshaft shown by the binary data $D_1$, the comparing operation by comparator 78 is easily carried out merely by comparing the bits of data $D_1$ with corresponding bits of data $DA_2$, respectively. Therefore, pulses $P_4$ are produced each time all of the bits of data $D_1$ are coincident with the corresponding bits of data $DA_2$. Pulses $P_4$ are applied as reset/start pulses to the programable counter 76 to which the pulse train signal $P_2$ is also applied as count pulses, and are also applied as set pulses to an R-S flip-flop 79.

The angle per bit of data $DA_1$ is determined as being the same as the angle of rotation of crankshaft 53 necessary for producing one pulse in circuit 57 and programable counter 76 is arranged so as to produce output pulse when the number of count pulses $P_2$, applied to programable counter 76 after counter 76 is reset by the application of pulse $P_4$, is coincident with the number shown by binary data $DA_1$. Therefore, programable counter 76 is reset and starts to count the pulses of pulse train signal $P_2$ each time pulse $P_4$ is produced, and an end timing pulse $P_5$ is developed by the programable counter 76 when the content of the count in programable counter 76 is coincident with the content of binary data $DA_1$. Consequently, in this case, when the number of counted pulses in counter 76 after resetting reaches the value of the binary code of data $DA_1$, the end timing pulse $P_5$ is produced and applied to a reset terminal of the R-S flip-flop 79 for producing a control pulse $P_6$ from its Q output terminal.

The operation of programable counter 76 and R-S flip-flop 79 will be described with reference to FIGS. 5A to 5E. Referring to FIGS. 5A and 5B, the timing of the occurrence of pulses $P_4$ is advanced relative to that of pulses $P_3$ by an angle $\theta r$ indicative of the optimum injection advance which is determined in accordance with data $DA_2$. The R-S flip-flop 79 is set at the leading edge of each pulse $P_4$ to change the control signal $P_6$ from the Q output terminal to "1" (FIG. 5E). Therefore, driving circuit 80 starts to energize coil 30 in response to the above-mentioned change in level of control signal $P_6$ to close solenoid valve 24 at the time pulse $P_4$ occurs.

On the other hand, the programable counter 76 is reset and starts to count the pulses of pulse train signal $P_2$ and end timing pulses $P_5$ are produced when the count in the programable counter 76 reaches a value corresponding to the optimum effective angle Tr which is determined by first data processing unit 76 (FIGS. 5C and 5D). Then R-S flip-flop 79 is reset by the leading edge of the end timing pulses $P_5$ to change the level of the control signal $P_6$ to "0" so that the solenoid valve 24 is opened.

As will be understood from the foregoing description, the solenoid valve 24 is operated by the control unit shown in FIG. 2 so as to be closed at the optimum time for the beginning of the fuel injection as determined in accordance with the conditions of the engine operation and opened just after the optimum amount of fuel injected is injected.

As a result, it can easily and exactly be realized to electrically control the injection timing and the amount of fuel injected. In another version, the high-pressure chamber 17 is isolated from the passage 28 at the beginning of the timing of the injection as computed by the control unit 31 to allow the initiation of fuel injection and the high-pressure chamber 17 is brought into communication with the passage 28 at the ending time as computed by the effective injection angle computing circuit 57 to finish the fuel injection. Thus, the beginning and end timing of the fuel injection is electrically controlled with high accuracy by the control of solenoid valve 24.

Figure 6:
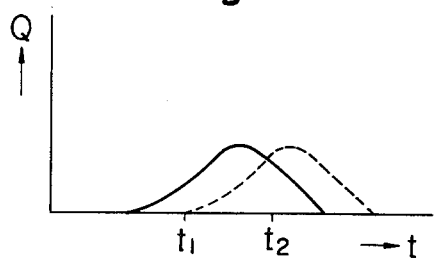
FIG. 6 is a characteristic diagram for explaining an operation of a fuel injection rate control device.

The operation of the injection rate control device 40 will now be described. FIG. 6 is a characteristic curve showing the relationship between the fuel quantity Q injected by plunger 12 and time. As can be understood from FIG. 6, the characteristic curve is shifted along the time axis according to the position of the piston 42. Therefore, when the solenoid valve 24 is closed to start the injection at a time $t=t_1$ and opened to end the injection at a time $t=t_2$, by controlling the position of the piston 42, for example, if the characteristic shown by the solid line in FIG. 6 is selected, the injection rate can be increased and if the characteristic shown by the dotted line is selected, the injection rate can be lowered. Thus, where the beginning and ending of the injection is controlled by the electromagnetic valve 24 according to the present invention, an existing timer mechanism can be used as the injection rate control device without making alterations.

Figure 7:
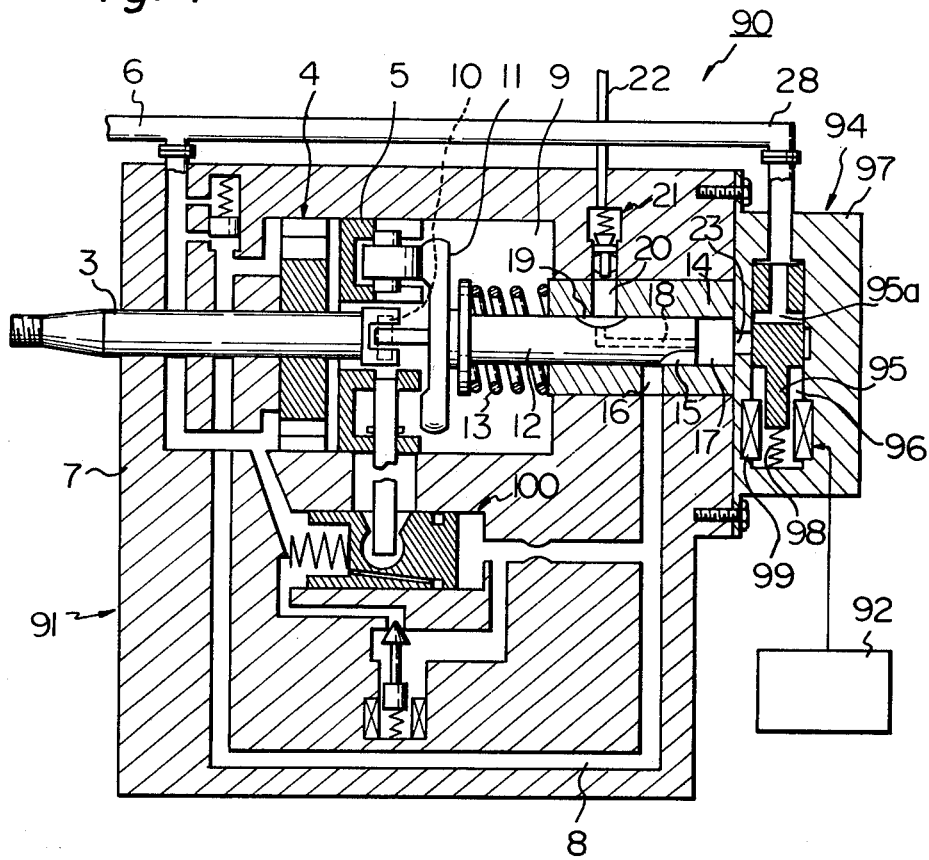
FIG. 7 is a sectional view of another embodiment of a distribution type fuel injection apparatus of the present invention.

FIG. 7 illustrates another embodiment of the present invention. A fuel injection apparatus 90 shown in FIG. 7 is arranged in such a way that the optimum amount of fuel injected at every instance can be provided to the engine by electrical control. The apparatus 90 is also comprised of a fuel injection pump 91 and a control unit 92, and the arrangement of the fuel injection pump 91 is the same as that of the fuel injection pump 2 shown in FIG. 1 except for a solenoid valve 94. Therefore, in FIG. 7, the portions corresponding to portions in FIG. 1 are designated by like reference symbols. Fuel injection pump 91 is provided with a solenoid valve 94 corresponding to the solenoid valve 24 shown in FIG. 1 and solenoid valve 94 is connected to high-pressure chamber 17 through passage 23 so as to enable high-pressure chamber 17 to communicate with the fuel tank by means of an electric signal sent from unit 92. Solenoid valve 94 is comprised of a piston 95 having a passage 95a therein and a cylindrical chamber 96 formed in the valve body 97 for housing piston 95 therein. One end of the cylindrical chamber 96 communicates with the fuel tank (now shown) through the passage 28. The piston is normally biased upwardly by a spring 98. When an exciting coil 99 for actuating the piston by an electromagnetic attracting force is deenergized, piston 95 is so positioned that an open end of passage 23 on the solenoid valve side is closed by a side wall of piston 95 to put the solenoid valve 94 into a closed position as illustrated in FIG. 7. On the other hand, when the exciting coil 99 is energized, piston 95 is so positioned that passage 23 may communicate with the passage 95a by the electromagnetic attracting force of the coil 99 and solenoid valve 94 is in its open position.

Reference numeral 100 designates a timer for adjusting timing of fuel injection beginning and the arrangement of the timer 100 is the same as that of the injection rate control device 40 in FIG. 1. Other arrangements of the fuel injection pump 92 are the same as those of pump 2 illustrated in FIG. 1 so that the detailed description thereof will be omitted.

Figure 8B:
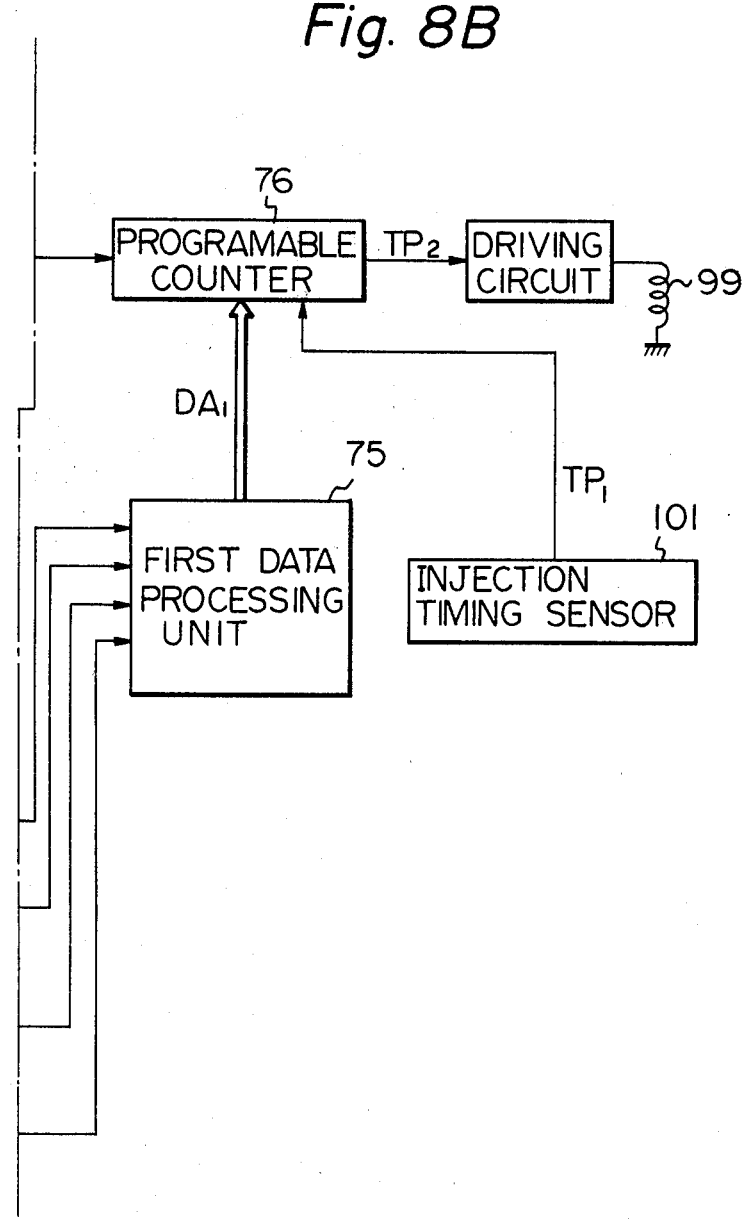

FIG. 8 illustrates a block diagram of the control unit 92 which controls the solenoid valve 94 so as to be able to inject the optimum amount of fuel into the engine in accordance with the conditions of the engine operation. The control system comprises sensors for detecting the conditions of the engine operation and producing analog signals indicative of the engine speed, the degree of the accelerator pedal depression, the coolant temperature and the engine load. Since these sensors and some blocks are the same as those in FIG. 2, the blocks corresponding to the blocks in FIG. 2 are designated by the same reference numerals and the detailed description thereof will be omitted. The control system has an injection timing sensor 101 for detecting the start timing of fuel injection from a fuel injection nozzle (now shown) mounted on the engine and for generating a timing pulse TP indicative of the timing of fuel injection beginning. The injection timing sensor 101 may include a strain gauge mounted on the outer wall of the injection pipe 22 or may be a sensor for detecting the timing of a lifting motion as of a needle valve of the injection nozzle. The timing pulse $TP_1$ is applied as reset/start pulse to the programable counter 76.

As well as the embodiment illustrated in FIG. 2, the number of pulses to be input to the programable counter 76 upon every rotation of a crankshaft 53 of the engine by a predetermined angle is preliminarily known, and data $DA_1$ is binary data the content of which is a pulse number corresponding to the effective angle. Therefore, the programable counter 76 starts to count the pulses of the pulse train signal $P_2$ at the time of the generation of timing pulse $TP_1$, and when the count content reaches the number determined by data $DA_1$, an end timing pulse $TP_2$ with a predetermined pulse width is produced from the programable counter 76 and applied to a driving circuit 80 for operating solenoid valve 94. When the end timing pulse $TP_2$ is produced, driving circuit 102 produces an exciting current for the time corresponding to the pulse width of timing pulse $TP_2$ to excite coil 99. As a result, the normally closed type solenoid valve 94 is opened as described above in response to the occurrence the timing pulse $TP_2$. Since the pulse width of the end timing pulse $TP_2$ enough to stop the fuel injection is selected, when the end timing pulse $TP_2$ is produced, the pressure in the high-pressure chamber 17 is lowered to stop the fuel injecting operation of the injection pump 91. With this arrangement, since the optimum end timing of the fuel injection is determined on the basis of the conditions of the engine operation at each instance and the termination of the fuel injection is electrically controlled in accordance with the result, accurate timing control of the fuel injection is easily possible to provide the optimum amount of fuel injected for a long time.

Moreover, since a control sleeve and a governer for controlling the position of the control sleeve is replaced by the solenoid valve 94 and its control unit 92, the mechanism of the pump is simplified and the accurate control of the amount of fuel injected can easily be attained without difficult adjustment.

Although the normally closed type solenoid valve employed in the above mentioned embodiment is controlled so as to open when it is energized, it is also possible for the normally open type solenoid valve to be employed instead of the normally closed type solenoid valve and the control circuit arranged so as to open the normally open type solenoid valve only when the end timing pulse $TP_2$ is produced. In this case, a fail safe system will be obtained.

We claim:

1. A distribution type fuel injection apparatus wherein fuel can be pressurized in a high-pressure chamber and injected therefrom to an engine to be associated therewith by a reciprocating motion of a plunger adapted to rotate, comprising:
   means including a solenoid valve for controlling pressure in the high-pressure chamber;
   means for producing a data signal indicative of an optimum period for injecting fuel on the basis of operating conditions of the engine;
   means for generating a beginning signal indicative of the time of the beginning of fuel injection;
   means for computing the time for ending fuel injection required for obtaining said optimum period for injecting fuel on the basis of said data signal and said beginning signal; and
   means for actuating said solenoid valve in response to the result computed by said computing means so as to reduce pressure in the high-pressure chamber;
   wherein said generating means includes an injection timing sensor for detecting the actual time the injection of fuel begins.

2. A distribution type fuel injection apparatus as claimed in claim 1 wherein the fuel in said high-pressure chamber is drawn off through said solenoid valve to a fuel tank when the solenoid valve is opened.

3. A distribution type fuel injection apparatus as claimed in claim 1 wherein said producing means has at least one sensor for detecting a condition of the engine operation and a data processing circuit for producing said data signal in accordance with the detecting result from said at least one sensor.

4. A distribution type fuel injection apparatus as claimed in claim 1 wherein said producing means has a speed sensor for producing a pulse signal composed of pulses each produced as a crankshaft of the engine rotates by a predetermined angle, a circuit for producing digital data indicative of the engine speed on the basis of said pulse signal and a data processor for producing said data signal in digital form in accordance with at least said digital data indicative of the engine speed.

5. A distribution type fuel injection apparatus as claimed in claim 1 wherein said generating means includes a mechanical timer device for controlling the time of beginning fuel injection in accordance with the engine speed.

6. A distribution type fuel injection apparatus as claimed in claim 1 wherein said producing means has a speed sensor for producing a pulse signal composed of pulses each produced as a crankshaft of the engine rotates by a predetermined angle, a circuit for producing digital data indicative of the engine speed on the basis of said pulse signal and a data processor for producing said data signal in digital form in accordance with at least said digital data indicative of the engine speed, and said computing means is a counter which is reset and started to count the pulses of said pulse signal from said speed sensor in response to said beginning signal and produces an output pulse when the counting result reaches a predetermined value determined by said data signal, said output pulse being applied to said actuating means in order to stop the fuel injection.

7. A distribution type fuel injection apparatus wherein fuel can be pressurized in a high-pressure chamber and injected therefrom to an engine to be associated therewith by a reciprocating motion of a plunger adapted to rotate, comprising:
   means including a solenoid valve for controlling pressure in the high-pressure chamber;
   means for producing a data signal indicative of an optimum period for injecting fuel on the basis of operating conditions of the engine;
   means for generating a beginning signal indicative of the time for beginning fuel injection;
   means for computing the time for ending fuel injection required for obtaining said optimum period for injecting fuel on the basis of said data signal and said beginning signal; and means for actuating said solenoid valve in response to the result computed by said computing means so as to reduce pressure in the high-pressure chamber;

wherein said producing means has a speed sensor for producing a pulse signal composed of pulses each produced as a crankshaft of the engine rotates by a predetermined angle, a circuit for producing digital data indicative of the engine speed on the basis of said pulse signal and a data processor producing said data signal in digital form in accordance with at least said digital data indicative of the engine speed, and said computing means is a counter which is reset and started to count the pulses of said pulse signal from said speed sensor in response to said beginning signal and produces an output pulse when the counting result reaches a predetermined value determined by said data signal, said output pulse being applied to said actuating means in order to stop the fuel injection.

8. A distribution type fuel injection apparatus wherein fuel may be pressurized in a high-pressure chamber and injected therefrom to an engine to be associated therewith by a reciprocating motion of a plunger adapted to rotate, comprising:

means including a solenoid valve for controlling pressure in the high-pressure chamber;

means for producing a data signal indicative of the time for beginning fuel injection;

means for generating a beginning signal indicative of the time for beginning fuel injection;

means for computing the time for ending of fuel injection required for obtaining said optimum period for injecting fuel on the basis of said data signal and said beginning signal; and means for actuating said solenoid valve in response to the result computed by said computing means so as to reduce pressure in the high-pressure chamber;

wherein said generating means includes a timing signal generator which generates an optimum beginning signal indicative of the optimum time for the beginning of fuel injection in accordance with the conditions of the engine operation and means for generating an angle signal corresponding to the angular position of a crankshaft of the engine;

wherein said timing signal generator includes at least one sensor for detecting a condition of the engine operation, a second circuit for computing the optimum time for beging fuel injection in accordance with the condition detected by said sensor, and a third circuit for producing said optimum beginning signal when the position of said crankshaft shown by said angle signal is coincident with the position for optimum timing for the beginning of fuel injection; and wherein said first circuit has a reference timing generator for generating a pulse train signal composed of pulses each produced as the crankshaft rotates by a predetermined angle and a pulse counter which is reset at the time of the application of the reference timing signal and counts the pulses of the pulse train signal to produce said angle signal in digital form.

9. A distribution type fuel injection apparatus as claimed in claim 8, said operating means serving to close said solenoid valve in response to said beginning timing signal.

* * * * *